US012570358B2

(12) United States Patent (10) Patent No.: US 12,570,358 B2

Trebuchon (45) Date of Patent: Mar. 10, 2026

(54) POWER STEERING ARCHITECTURE WITHOUT MECHANICAL CONNECTION BETWEEN THE STEERING WHEEL AND THE STEERING MECHANISM OF THE VEHICLE

(71) Applicant: JTEKT EUROPE, Irigny (FR)

(72) Inventor: Jean-Michel Trebuchon, Chasse sur Rhone (FR)

(73) Assignee: JTEKT Europe, Irigny (FR)

( * ) Notice: Subject to any disclaimer, the term of this patent is extended or adjusted under 35 U.S.C. 154(b) by 70 days.

(21) Appl. No.: 18/781,070

(22) Filed: Jul. 23, 2024

(65) Prior Publication Data

US 2025/0033696 A1 Jan. 30, 2025

(30) Foreign Application Priority Data

Jul. 25, 2023 (FR) ...................................... 2307982

(51) Int. Cl.
B62D 6/00 (2006.01)
B62D 5/00 (2006.01)

(52) U.S. Cl.
CPC ............. B62D 6/008 (2013.01); B62D 5/003 (2013.01)

(58) Field of Classification Search
CPC ...... B62D 6/008; B62D 5/003; B62D 5/0487; B62D 5/001; B62D 5/04; B62D 5/046; B62D 5/0478; B62D 5/0484; B62D 3/12
See application file for complete search history.

(56) References Cited

U.S. PATENT DOCUMENTS

| | | | | |
|---|---|---|---|---|
| 6,152,254 A | * | 11/2000 | Phillips .................. | B62D 5/065 |
| | | | | 180/421 |
| 6,983,816 B2 | | 1/2006 | Takahashi et al. | |
| 7,604,088 B2 | * | 10/2009 | Nishizaki ................. | B62D 6/10 |
| | | | | 180/444 |
| 7,900,742 B2 | | 3/2011 | Kubokawa et al. | |
| 2007/0205041 A1 | * | 9/2007 | Nishizaki ............. | B62D 5/0472 |
| | | | | 180/446 |

(Continued)

FOREIGN PATENT DOCUMENTS

| | | | | |
|---|---|---|---|---|
| WO | WO-2017135884 A1 | * | 8/2017 | ............. B60Q 5/005 |
| WO | WO-2017184064 A1 | * | 10/2017 | ............. B62D 6/008 |

OTHER PUBLICATIONS

Feb. 2, 2024 Written Opinion issued in French Patent Application No. FR2307982.

(Continued)

*Primary Examiner* — Joseph J Dallo

(74) *Attorney, Agent, or Firm* — Oliff PLC

(57) ABSTRACT

A method for controlling a power steering system of a motor vehicle, the method including steps of: detecting an operating state of a steering actuator coupled to a rack; when the steering actuator is operational, providing a torque setpoint to a main motor of the steering actuator, by a first control unit of the steering actuator; when the steering actuator is faulty, but provides an angular position measurement of the main motor, controlling, by a second control unit, a brushless auxiliary motor, coupled to the rack, based on measuring the angular position of the main motor and an angular position of a steering wheel; and when the steering actuator has completely failed, controlling the auxiliary motor according to the angular position of the steering wheel.

12 Claims, 2 Drawing Sheets

(56) References Cited

U.S. PATENT DOCUMENTS

| 2014/0246264 | A1* | 9/2014 | Alderson | B62D 6/008 |
| | | | | 180/432 |
| 2015/0191198 | A1* | 7/2015 | Perichon | G05G 5/16 |
| | | | | 29/428 |
| 2016/0304123 | A1* | 10/2016 | Lewis | B62D 5/0421 |
| 2019/0047618 | A1* | 2/2019 | Hultén | B60W 10/30 |
| 2019/0061809 | A1* | 2/2019 | Weiefors | B62D 5/062 |

OTHER PUBLICATIONS

Feb. 2, 2024 Search Report issued in French Patent Application No. FR2307982.

* cited by examiner

POWER STEERING ARCHITECTURE WITHOUT MECHANICAL CONNECTION BETWEEN THE STEERING WHEEL AND THE STEERING MECHANISM OF THE VEHICLE

TECHNICAL FIELD

The present invention concerns the field of electric power steering devices for motor vehicles, and more particularly SBW ("Steer by Wire") type power steering devices, that is to say without mechanical connection between the steering wheel and the steering mechanism of the vehicle.

STATE OF THE ART

An electric power steering device for a motor vehicle generally includes a mechanical part comprising a steering wheel connected via a steering column and an intermediate axis to a steering pinion engaged with a rack, slidably mounted in a steering casing. The two opposite ends of the rack are respectively connected, via tie-rods, to the right and left steering wheels of the vehicle. To assist the manual effort exerted by the driver of the vehicle on the steering wheel, an electric assistance actuator with two directions of rotation is coupled, via a speed reducer, to the mechanical steering connection between the steering column and the steering wheels of the vehicle, so as to transmit a motor torque (possibly also a resistive torque) for assistance to the steering column. The assistance actuator is driven by an on-board electronic computer, which receives and processes various signals coming from sensors including in particular a torque sensor exerted on the steering column by the driver of the vehicle.

In an SBW type electrical assistance device, the steering wheel is not mechanically coupled to the rack 8, the steering of the vehicle being controlled by an actuator mechanically coupled to the rack. This steering architecture provides greater ease of integrating the steering system into the vehicle. Furthermore, the angular position of the steering wheel is uncorrelated from the angular position of the wheels, which makes it possible to offer a large amplitude of maneuver at low speed, in particular for parking maneuvers, and to limit the effects of the rotation of the steering wheel on the steering at high speed.

However, in order to ensure safety objectives, a certain redundancy is necessary so that in the event of a failure of part of the device, the driver can maintain the control of the direction of the vehicle. For this purpose, it has already been proposed to place a clutch on the steering column making it possible to reestablish the mechanical connection between the steering wheel and the rack, in the event of failure of the actuator coupled to the rack. This solution does not make it possible to eliminate the classic mechanical connection with its disadvantages in order to integrate it into the vehicle. It was also proposed to implement two redundant rack actuation motors. Thus, if one of the motors fails, the other takes over. This architecture can easily be integrated into a vehicle, but offers a security which may be considered insufficient due to the fact that it does not make it possible to overcome a failure of the control electronics of the two motors. It was therefore also proposed to implement two computers, each controlling one of the motors. However, this solution has a relatively high cost.

It is therefore desirable to be able to propose an electric power steering architecture for an SBW type motor vehicle offering high fault tolerance while having a lower cost compared to the solutions of the prior art.

SUMMARY

Embodiments concern a method for controlling a motor vehicle power steering system, the method comprising: detecting an operating state of a steering actuator mechanically coupled to a first steering pinion engaged with a steering rack of the motor vehicle; when the steering actuator is operational, providing, by a first control unit of the steering actuator, a torque setpoint to a main motor of the steering actuator; when the steering actuator fails, but provides an angular position measurement of the main motor, controlling, by a second control unit, a brushless auxiliary motor, mechanically coupled to a second steering pinion engaged with the steering rack, using a closed-loop angle regulation function receiving the angular position measurement of the main motor and an angular position measurement of a steering wheel of the vehicle; and when the steering actuator completely fails, controlling the auxiliary motor by the second control unit, using an open-loop angle regulation function receiving the angular position measurement of the steering wheel.

In this way, the necessary redundancy of the vehicle steering control in an SBW type power steering system is provided by a brush motor which requires a significantly simpler and less expensive power circuit than that of a brushless motor. The use of a brush motor offers the possibility of moving the power circuit away from the brush motor and in particular of placing the latter in an area far from the rack and therefore the steering actuator, in order to reduce the risk of a simultaneous failure of the steering actuator and the power circuit.

According to one embodiment, the second control unit belongs to a force feedback actuator coupled to the steering wheel.

Thus, it is not necessary to provide a specific control unit for the brush motor. This arrangement does not reduce the operational safety of the power steering, since the control unit of the force feedback actuator on the steering wheel is less prone to failure than the steering actuator.

According to one embodiment, the auxiliary motor is controlled by the second control unit via a power circuit installed in a force feedback actuator coupled to the steering wheel.

In this way, the power circuit is located in a different area from the steering actuator. This prevents the steering actuator and the power circuit of the auxiliary motor from being subjected to the same constraints, whether climatic, mechanical or electromagnetic, which could lead to simultaneous malfunction of these components.

According to one embodiment, the method further comprises: when the steering actuator fails, mechanically coupling the auxiliary motor to the second steering pinion using a clutch; and when the steering actuator is operational, mechanically decoupling the auxiliary motor from the second steering pinion using the clutch.

The provision of such a clutch allows preventing the brush motor from rotating when it is not activated. In this way, the brushes of the brush motor only wear out when the latter is activated, that is to say in the rare periods when the steering actuator fails.

According to one embodiment, the method further comprises: when the steering actuator is operational, providing, by the second control unit, a torque setpoint to the auxiliary motor in addition to the torque setpoint supplied to the main motor of the steering actuator.

Embodiments may also concern a power steering system for a motor vehicle, the system comprising: a steering actuator comprising a main motor mechanically coupled to a first steering pinion engaged with a steering rack of the motor vehicle, and a first control unit configured to control the main motor, a brushless auxiliary motor mechanically coupled to a second steering pinion engaged with the steering rack, and a second control unit configured to control the auxiliary motor by implementing the previously defined method.

According to one embodiment, the system comprises a force feedback actuator coupled to the steering wheel and comprising the second control unit.

According to one embodiment, the force feedback actuator comprises a first power circuit connected to the second control unit and to a force feedback motor coupled to the steering wheel, the second control unit being configured to control the force feedback motor.

According to one embodiment, the force feedback actuator comprises a second power circuit connected to the second control unit and to the auxiliary motor, to allow the second control unit to control the auxiliary motor.

According to one embodiment, the system comprises a clutch for mechanically coupling the auxiliary motor to the second steering pinion, the clutch being controlled by the second control unit.

According to one embodiment, the auxiliary motor is sized to only allow vehicle parking maneuvers.

Embodiments may also concern a motor vehicle comprising a power steering system as previously defined.

BRIEF DESCRIPTION OF THE FIGURES

The present invention will be better understood with the aid of the following description of exemplary embodiments with reference to the appended figures, in which identical reference signs correspond to structurally and/or functionally identical or similar elements.

DETAILED DESCRIPTION

Figure 1:
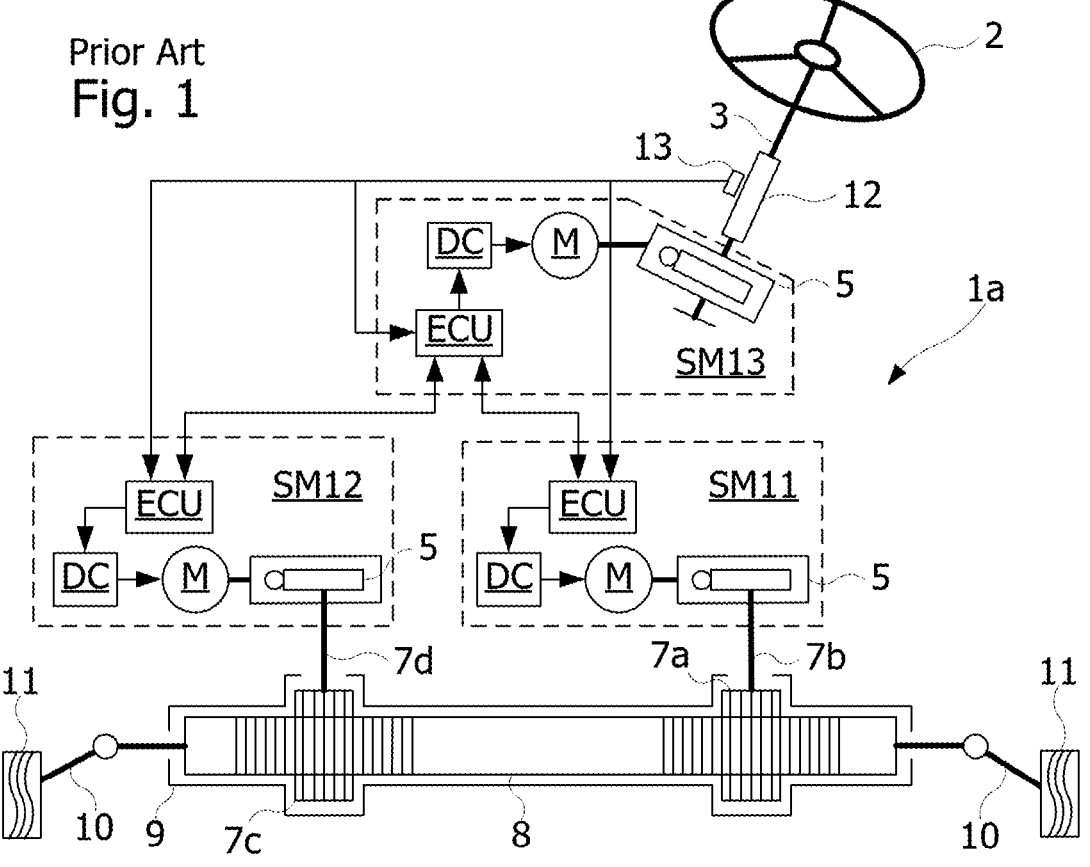
FIG. 1 is a schematic view of a conventional motor vehicle power steering system.

FIG. 1 represents a classic motor vehicle steering system 1a equipped with an electrical assistance device, according to the prior art. The power steering device 1a, of the SBW ("Steer by Wire") type, comprises a steering column 3 coupled to a steering wheel 2, and two redundant actuators SM11, SM12 mechanically coupled to a rack bar 8. Thus, the two actuators SM11, SM12 are mechanically coupled respectively to pinion shafts 7b, 7d. The pinion shafts 7b, 7d are mechanically coupled respectively to pinions 7a, 7c, engaged with a rack bar 8 slidably mounted in a steering carter 9. The two opposite ends of the rack bar 8 are respectively connected, via connecting rods 10, to the right and left steered wheels 11 of the vehicle.

Each actuator SM11, SM12 comprises an electric assistance motor M with two directions of rotation, a control circuit DC of the motor M, and a speed reducer 5. The output shaft of the motor M is mechanically coupled, respectively to the pinion shafts 7b, 7d, via the speed reducer 5. Each actuator SM11, SM12 also comprises a control unit (on-board electronic computer) ECU which receives and processes various signals coming from sensors, in particular from a sensor steering wheel angle 13, and provides control signals to the control circuit DC of the motor M of the actuator. Each speed reducer 5 can be of the type comprising a screw including an endless screw shaft and a screw tangent wheel secured to one of the pinion shafts 7b, 7d.

The power steering system 1a further comprises a third actuator SM13 coupled to the steering column 3 to provide the steering wheel 2 with a resistive or motor torque. This resistive or motor torque varies depending on different parameters such as the torque applied to the steering wheel by the driver, the torque applied to the steering pinion 7a or 7c and the speed of the vehicle. The actuator SM13 comprises an electric assistance motor M with two directions of rotation, a control circuit DC of the motor M, a speed reducer 5 coupled on one side to the motor M and on the other side to the steering column 3 (between a distal bearing of the steering column and the torsion bar 12), and a control unit ECU.

The control unit ECU of the actuator SM13 is connected to the control units ECU of the actuators SM11, SM12 and configured to control the motor M of the actuator SM13 in order to provide a force feedback on the steering wheel 2. In particular, the control unit ECU of the actuator SM13 is configured to control the motor M of the actuator SM13, so as to transmit a resistive torque (possibly also a motor torque) to the steering column 3, proportional to the torque supplied by the motors M of the actuators SM11, SM12.

The force feedback exerted by the actuator SM13 makes it possible to oppose the driver's movements on the steering wheel, a resistant torque varying in particular according to the speed of the vehicle. Thus, for example, at very low speed, during parking maneuvers, the resisting torque applied to the steering column 3 is low. On the contrary, at higher speed, this resistant torque is higher for safety reasons, to avoid rapid and large amplitude movements of the steering wheel.

Figure 2:
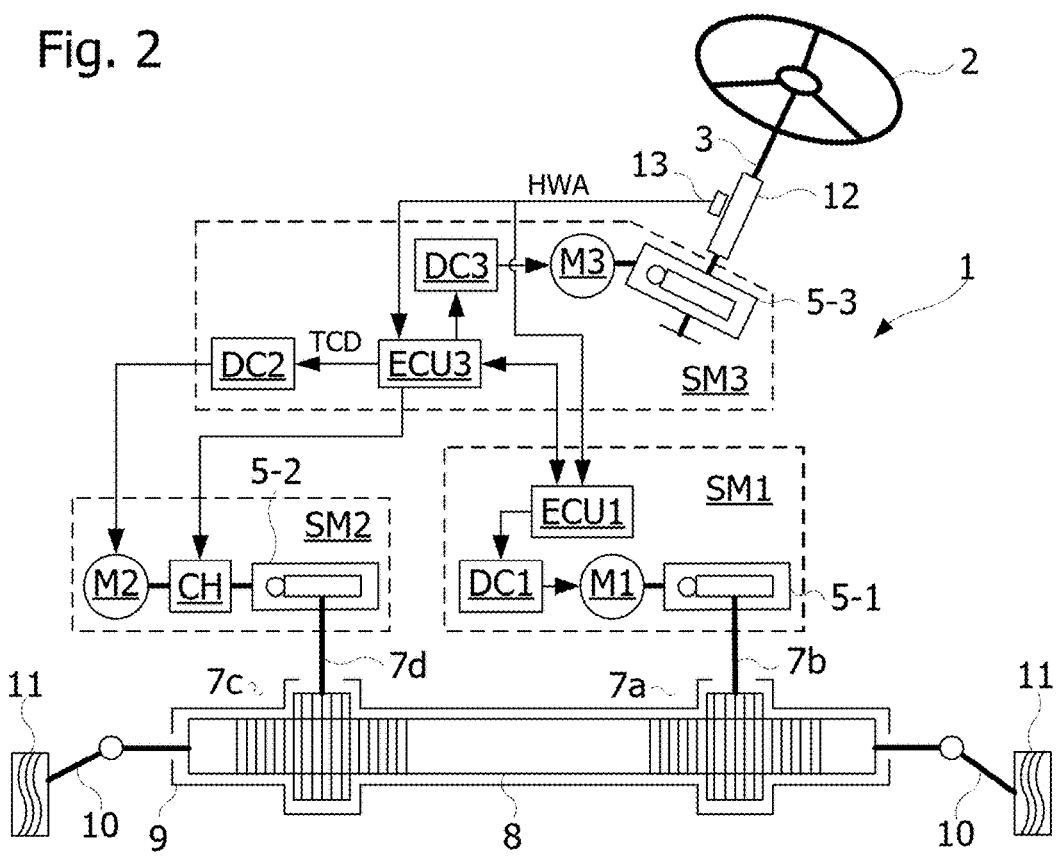
FIG. 2 is a schematic view of a motor vehicle power steering system, according to one embodiment, FIG. 3 schematically represents a functional architecture of a computer of the power steering system, according to one embodiment, FIG. 4 schematically represents a functional architecture of a computer of the power steering system, according to another embodiment.

FIG. 2 shows a power steering device 1, according to one embodiment. The device 1 differs from the power steering device 1a in that the actuators SM11, SM12, SM13 are replaced by actuators SM1, SM2, SM3. The actuator SM1 can be identical to the actuator SM11. On the other hand, the actuator SM2 which is coupled to the pinion shaft 7d comprises a motor M2. The motor M2 can be coupled to the pinion shaft 7d through a speed reducer 5-2. The actuator SM3 which is coupled to the steering column 3 via a reducer 5-3 comprises a control unit ECU3, a motor M3 and a control circuit DC3 allowing the control unit ECU3 to control the motor M3. The actuator SM2 is designed to be activated in the event of a failure of the actuator SM1.

The control unit ECU3 of the actuator SM3 is connected to the control unit ECU1 of the actuator SM1 in particular to transmit to the latter measurement values of a steering wheel angle HWA relative to a neutral position of the steering wheel 2, in redundancy with an angle measurement HWA carried out by the steering wheel angle sensor 13, directly transmitted to the control unit ECU1. The control unit ECU1 transmits to the processing unit ECU3 in particular one of the torque setpoint values applied by the motor M1 to the pinion 7a.

According to one embodiment, the motor M2 is of the brush type, while the motors M1, M3 of the actuators SM1 and SM3 are conventionally brushless motors. Furthermore, the control unit ECU3 is configured to control the motor M2 via a control circuit DC2 which is remote for example in the actuator SM3. For the control of the brush motor M2, the circuit DC2 can simply comprise an H-bridge of MOSFET type transistors.

The implementation of a brush motor is much less expensive than a brushless motor. Indeed, the control circuit DC2 of the brush motor M2 is much less complex than the control circuit DC1 of the brushless motor M1 of the actuator SM1. Unlike the brushless motors, a brush motor does not require an angular position sensor to drive it. As a result, the connection between the control circuit DC2 and the motor M2 requires only two wires, while the connection between the control circuit DC1 and the motor M1 requires at least five wires. This last advantage makes it possible to move the control circuit DC2 away from the motor M2. Thus, the control circuit DC2 can for example be installed in the actuator SM3 or near the steering wheel 2. This results in a reduction in the risk of malfunction of the actuators SM2 and SM1, their respective control circuits do not use the same technologies, and not subjecting to the same constraints, whether climatic, mechanical or electromagnetic.

According to one embodiment, a clutch CH is interposed between the motor M2 and the speed reducer 5-2 of the actuator SM2. The clutch CH makes it possible to mechanically decouple the motor M2 from the shaft 7d when the actuator SM2 is not activated, and conversely mechanically couple the motor M2 to the shaft 7d upon the activation of the actuator SM2 when the actuator SM1 fails. The clutch CH can be controlled by the control unit ECU3. Thus, the clutch CH makes it possible to prevent the motor M2 from rotating when the actuator SM2 is not activated, and therefore to avoid increasing the inertia and friction of the system when the motor M2 is inactive, and also limit the wear of the motor M2 brushes.

Figure 3:
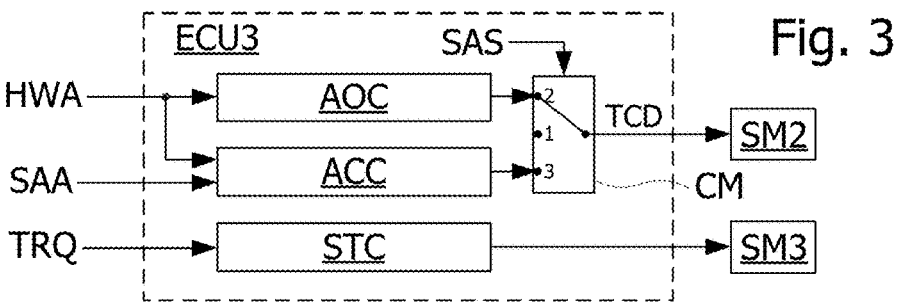

FIG. 3 shows functions of the control unit ECU3. The control unit ECU3 comprises an open-loop angle regulation function AOC, a closed-loop angle regulation function ACC, a torque control function STC, and a switching function CM. The functions AOC and ACC receive the angle measurement signal HWA from the steering wheel angle sensor 13. The function ACC also receives an angular position signal from the motor M1 from the control unit ECU1 of the actuator SM1. The function STC receives a set torque value signal TRQ from the control unit ECU1 of the actuator SM1. The value TRQ is proportional to the torque supplied by the motor M1. The switching function CM is controlled by a state signal SAS from the actuator SM1 provided by a self-diagnostic function from the actuator SM1. The state signal SAS can indicate any of the following states:

State 1: the actuator SM1 is completely operational,
State 2: the actuator SM1 is completely faulty, and
State 3: the actuator SM1 is faulty but reliably provides the angular position of motor M1 from the actuator SM1 to the control unit ECU3.

In state 1, the actuator SM1 is operational, and the motor M1 of the latter alone activates the steering of the vehicle via the pinion 7a. In state 2, only the function AOC is active and the control unit ECU3 controls the motor M2 on the basis of the angle measurement signal HWA from the steering wheel 2 alone. The motor M2 then alone activates the steering of the vehicle via the pinion 7c. In state 3, only the function ACC is active and the control unit ECU3 controls the motor M2 based on the angle measurement signal HWA and the angular position SAA of the motor M1 by the actuator SM1. In states 2 and 3, the motor M2 alone activates the steering of the vehicle via the pinion 7c. The motor M2 can be selected with the sole objective of allowing the vehicle to be parked as quickly as possible in a safe place. It can therefore be sized to achieve much more limited performance than the motor M1.

In state 2, the actuator SM1 can provide a value for the angular position SAA of the motor M1, but this value is not used because it is unreliable.

In parallel with the functions AOC and ACC, the function STC controls the motor M3 to apply a resistive or motor torque to the steering column 3 and thus exert a force feedback on the steering column 3, depending on the torque setpoint value TRQ supplied by the control unit ECU1 of the control actuator SM1, as long as this value is available. In this way, the driver can feel a torque when he has to turn the steering wheels of the vehicle.

Figure 4:
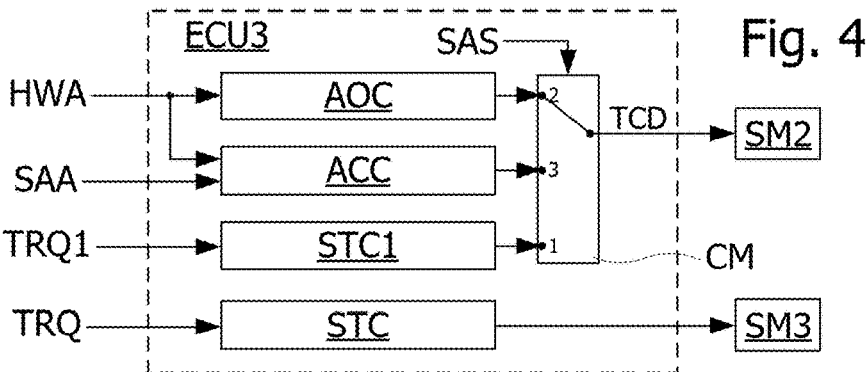

According to one embodiment illustrated in FIG. 4, the actuator SM2 is activated to provide an additional torque in combination with the torque provided by the actuator SM1 in state 1 during specific maneuvers. In this case, the control circuit ECU1 is configured to issue a command to this effect to the control circuit ECU3. Thus, FIG. 4 represents the functions of the control unit ECU3. The control unit ECU3 of FIG. 4 differs from that of FIG. 3 in that it further comprises a function STC1 which is activated in state 1 and which is configured to control the actuator SM2, in order to provide this additional torque in combination with the torque provided by the actuator SM1 during specific maneuvers.

It will be clear to those skilled in the art that the present invention is capable of various variants and various applications. In particular, the invention is not limited to the realization of the control functions of the auxiliary motor M2 in the control unit ECU3 of the force feedback actuator SM3. Indeed, a specific control unit can be implemented to control the motor M2.

Although the installation of the power circuit DC2 in the force feedback actuator SM3 offers more safety, this arrangement is not necessary. Furthermore, the power circuit can be arranged near the steering wheel outside the actuator SM3.

Moreover, the provision of the clutch CH simply allows the operating time of the motor M2 to be increased without having to change the brushes. This provision may be useless if the duration of operation of the motor M2 without changing the brushes is greater than the average duration of use of the vehicle.

The invention claimed is:

1. A method for controlling a power steering system of a motor vehicle, the method comprising:
detecting an operating state of a steering actuator mechanically coupled to a first steering pinion engaged with a steering rack of the motor vehicle;
when the steering actuator is operational, providing, by a first control unit of the steering actuator, a torque setpoint to a main motor of the steering actuator;
when the steering actuator fails, but provides an angular position measurement of the main motor, controlling, by a second control unit, a brushless auxiliary motor, mechanically coupled to a second steering pinion engaged with the steering rack, using a closed-loop angle regulation function receiving the angular position measurement of the main motor and an angular position measurement of a steering wheel of the vehicle; and
when the steering actuator has completely failed, controlling the auxiliary motor by the second control unit, using an open-loop angle regulation function receiving the angular position measurement of the steering wheel.

2. The method according to claim 1, wherein the second control unit belongs to a force feedback actuator coupled to the steering wheel.

3. The method according to claim 1, wherein the auxiliary motor is controlled by the second control unit via a power circuit installed in a force feedback actuator coupled to the steering wheel.

4. The method according to claim 1, further comprising:

when the steering actuator fails, mechanically coupling the auxiliary motor to the second steering pinion using a clutch; and when the steering actuator is operational, mechanically decoupling the auxiliary motor from the second steering pinion using the clutch.

5. The method according to claim 1, further comprising:

when the steering actuator is operational, supplying, by the second control unit, a torque setpoint to the auxiliary motor in addition to the torque setpoint supplied to the main motor of the steering actuator.

6. A power steering system for a motor vehicle, the system comprising:

a steering actuator comprising a main motor mechanically coupled to a first steering pinion engaged with a steering rack of the motor vehicle, and a first control unit configured to control the main motor, a brushless auxiliary motor mechanically coupled to a second steering pinion engaged with the steering rack, and a second control unit configured to control the auxiliary motor by implementing the method according to claim 1.

7. The system according to claim 6, comprising a force feedback actuator coupled to the steering wheel and comprising the second control unit.

8. The system according to claim 7, wherein the force feedback actuator comprises a first power circuit connected to the second control unit and to a force feedback motor coupled to the steering wheel, the second control unit being configured to control the force feedback motor.

9. The system according to claim 7, wherein the force feedback actuator comprises a second power circuit connected to the second control unit and to the auxiliary motor, to allow the second control unit to control the auxiliary motor.

10. The system according to claim 6, comprising a clutch for mechanically coupling the auxiliary motor to the second steering pinion, the clutch being controlled by the second control unit.

11. The system according to claim 6, wherein the auxiliary motor is sized to only allow parking maneuvers of the vehicle.

12. A motor vehicle comprising a power steering system according to claim 6.

* * * * *